US010558645B2

(12) United States Patent  
Abalos

(10) Patent No.: US 10,558,645 B2  
(45) Date of Patent: Feb. 11, 2020

(54) SYSTEMS AND METHODS FOR AN ENTERPRISE DATA INTEGRATION AND TROUBLESHOOTING TOOL

(71) Applicant: Level 3 Communications, LLC, Broomfield, CO (US)

(72) Inventor: Ariel E. Abalos, Buenos Aires (AR)

(73) Assignee: Level 3 Communications, LLC, Broomfield, CO (US)

( * ) Notice: Subject to any disclaimer, the term of this patent is extended or adjusted under 35 U.S.C. 154(b) by 285 days.

(21) Appl. No.: 15/427,485

(22) Filed: Feb. 8, 2017

(65) Prior Publication Data

US 2017/0364549 A1   Dec. 21, 2017

Related U.S. Application Data

(60) Provisional application No. 62/350,502, filed on Jun. 15, 2016.

(51) Int. Cl.
| | |
|---|---|
| *G06F 17/30* | (2006.01) |
| *G06Q 30/00* | (2012.01) |
| *G06F 16/23* | (2019.01) |
| *G06F 16/25* | (2019.01) |

(52) U.S. Cl.  
CPC ........ *G06F 16/2365* (2019.01); *G06F 16/252* (2019.01); *G06Q 30/016* (2013.01)

(58) Field of Classification Search  
None  
See application file for complete search history.

(56) References Cited

U.S. PATENT DOCUMENTS

| | | | | |
|---|---|---|---|---|
| 2008/0133613 | A1* | 6/2008 | Werner | G06F 9/52 |
| 2008/0235255 | A1* | 9/2008 | Greer | G06F 16/252 |
| 2014/0149554 | A1* | 5/2014 | Krishna | H04L 65/60 |
| | | | | 709/219 |
| 2015/0032778 | A1* | 1/2015 | Kelley | G06Q 10/06 |
| | | | | 707/803 |
| 2015/0379520 | A1* | 12/2015 | Allen | G06Q 30/016 |
| | | | | 705/304 |

* cited by examiner

*Primary Examiner* — Umut Onat

(57) ABSTRACT

Systems and methods are provided herein for retrieving and displaying integrated data of a network. An exemplary method includes receiving, at an enterprise service bus (ESB), a data request for data pertaining to applications associated with computing systems communicatively coupled to the ESB. The data request includes at least one predefined global data field. In response to receiving the data request, a data set is retrieved that includes data corresponding to the predetermined global data from at least two applications. The data set is then transmitted to a user interface for display in a comparative format.

20 Claims, 4 Drawing Sheets

SYSTEMS AND METHODS FOR AN ENTERPRISE DATA INTEGRATION AND TROUBLESHOOTING TOOL

CROSS-REFERENCE TO RELATED APPLICATIONS

This application is related to and claims priority under 35 U.S.C. § 119(e) from U.S. Patent Application No. 62/350,502, filed Jun. 15, 2016, titled "SYSTEMS AND METHODS FOR AN ENTERPRISE DATA INTEGRATION AND TROUBLESHOOTING TOOL," the entire content of which is incorporated herein by reference for all purposes.

TECHNICAL FIELD

Aspects of the present disclosure relate to a data integration and troubleshooting tool for analyzing data from a plurality of different systems of a network, such as a network of a telecommunications service provider; and more particularly, to systems and methods for integrating data from a plurality of networked systems using a unified framework and providing access to the integrated data at a user interface to facilitate troubleshooting and analysis of the integrated data.

BACKGROUND

A service provider in the telecommunications industry faces unique challenges with respect to data management. The service provider may manage hundreds of different applications (such as legacy applications, third-party applications, and middleware) in order to provide services to customers. Different platforms for the applications add complexity for the service provider. For example, the service provider may manage data associated with platforms directed to integration, analytics, and events processing, software for automating business processes, and the like. The service provider may also be responsible for data associated with customer relationship management (CRM), billing, enterprise resource planning (ERP), and delivery systems. As such, the data may be generated in a variety of different formats. The service provider may desire to share data between different systems, retrieve data from one or more systems, and/or replicate data from one or more systems to another. For example, the service provider may desire to share data from an order system with a billing system to complete an order and accurately bill a customer. Conventional enterprise-level tools lack sufficient technology to manage such data and ensure that such data is accurately distributed across different systems as needed. For example, a conventional enterprise-level system may not be able to validate that data from an order system is accurate before being sent to a billing system.

It is with these observations in mind, among others, that various aspects of the present disclosure were conceived and developed.

SUMMARY

Implementations described and claimed herein address the foregoing problems, among other, by providing systems and method for retrieving and displaying integrated data of a network. In one implementation, a method includes receiving, at an enterprise service bus (ESB), a data request for data pertaining to applications associated with computing systems communicatively coupled to the ESB. The data request includes at least one predefined global data field. In response to receiving the data request, a data set is retrieved that includes data corresponding to the predetermined global data from at least two applications. The data set is then transmitted to a user interface for display in a comparative format.

In another implementation, a system is provided that includes an enterprise service bus (ESB) communicatively couplable to a user interface and applications of networked computing systems. The ESB is configured to receive a data request from the user interface that includes at least one predefined global data field. In response to receiving the data request, the ESB retrieves data corresponding to the predefined global data field by communicating the data request to at least one of an application of the plurality of applications and a data store containing the integrated data. Upon receiving the requested data, the ESB transmits the transmit the retrieved data to the user interface.

In yet another implementation, a system for requesting and analyzing integrated data from a network is provided. The system includes a user interface communicatively coupleable to an enterprise service bus (ESB). The user interface is configured to generate data requests including at least one predefined global data field and to transmit the data requests to the ESB. The user interface is further configured to receive a data set including data corresponding to the at least one predefined global data field from the ESB and to display the data set in a comparative format.

BRIEF DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
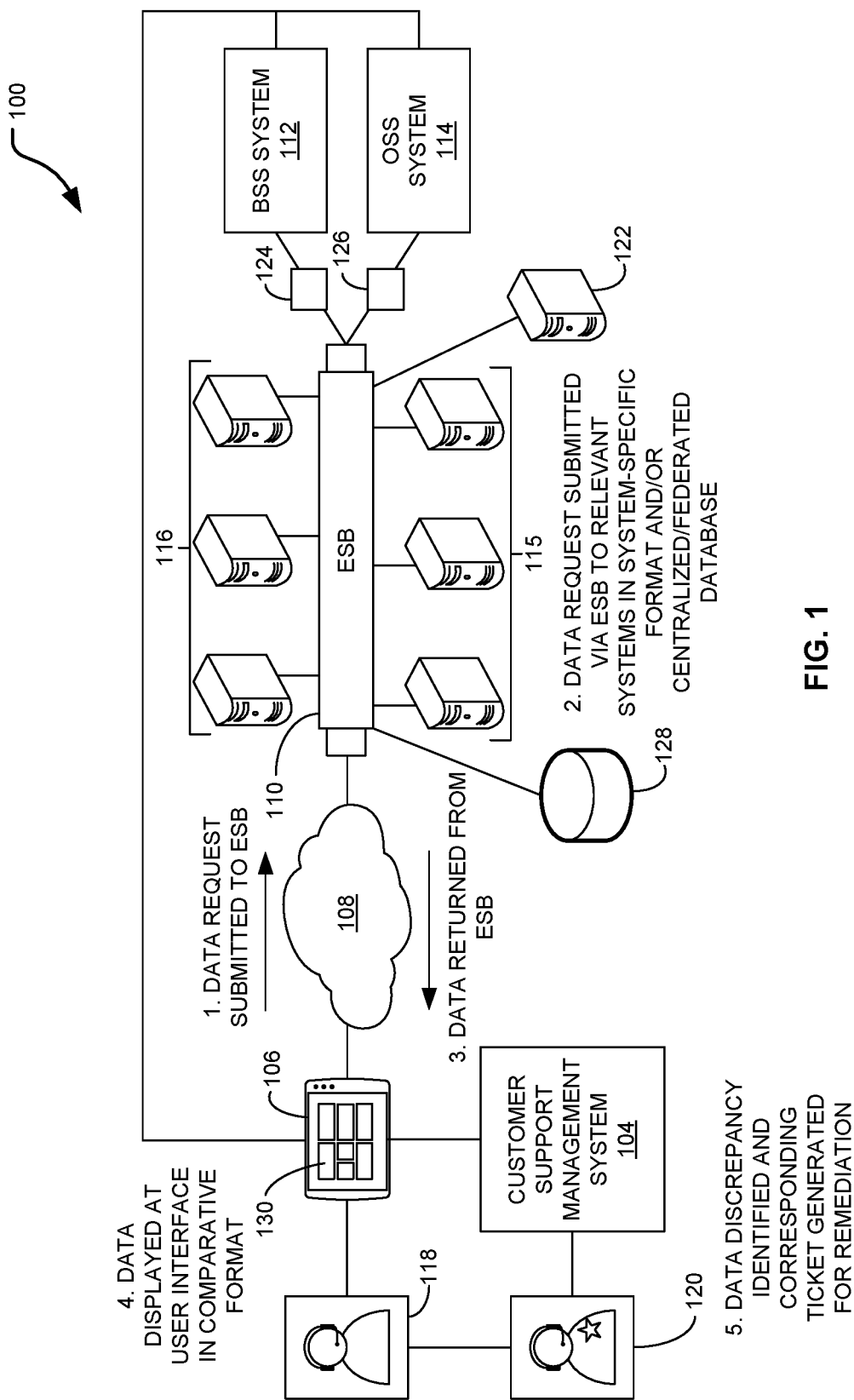
FIG. 1 is a schematic illustration of a system for an enterprise data integration and troubleshooting tool.

Aspects of the present disclosure are directed to a system for implementing an Enterprise Integration Troubleshooting Tool (EITT) embodied in an EITT application. The system generally includes a business layer operable to integrate data from different systems associated with a network, such as a telecommunications management and troubleshooting network, and a presentation layer for presenting the integrated data through a user interface. The user interface may then be used to validate the integrated data by, for example, comparing data of the different systems.

In one embodiment, the business layer of includes an enterprise service bus (ESB) operable to integrate data from multiple applications, systems, and platforms of a network.

Notably, the ESB is configured to facilitate data integration for applications, systems, and platforms that may use different data formats, communications protocols, and the like. The ESB defines a software/hardware architecture for integrating the data associated with the systems over a bus-like infrastructure. In other words, the ESB integrates data from different systems of the network by implementing a central communication bus, such as a message bus, between the systems. By doing so, the ESB enables access to, sharing, and integration of data of the different systems using a single, unified framework.

The ESB generally facilitates communication between systems coupled to the ESB. For example, in some embodiments, the ESB includes or is in communication with a messaging or integration server operable to allow independent and non-concurrent applications in the network to communicate with one another. In other embodiments, the ESB includes one or more adapters or adapter services to facilitate communication between systems. Each adapter or adapter service is generally operable to transform data and messages between a respective system format to a format for communication over the ESB. The adapter or adapter services may include various web interface protocols to marshal data between the systems.

In some embodiments, data from the respective systems is communicated over the ESB in a common canonical or standardized format, such as extensible markup language (XML). A common communication protocol may also be implemented to define a standard method of communication between the systems over the ESB. As such, the ESB defines a framework for data integration and communication between systems despite differences between operating systems, types of applications executed by the systems, message and data formats compatible with the systems, and programming languages.

In some embodiments, the business layer further includes data access components associated with the different applications, systems, and platforms. The data access components are operable to retrieve data from the applications, systems, and platforms for data integration.

In one embodiment, data values associated with a predefined set of global data fields, such as a number of customer premises equipment (CPE) devices associated with a particular order number, are mapped into a centralized database such that the database provides a single data source for analyzing data from the different systems corresponding to the predefined set of global data fields. For example, in one implementation, the centralized database includes a column for each system from which data has been integrated. The centralized database further includes rows corresponding to each data field of a set of predefined global data fields. Thus, the centralized database may contain values retrieved from each of the systems for each of the predefined global data fields. In some embodiments, the data values contained in the centralized database are dynamically updated as changes to the data values occur at the various systems. In such embodiments, changes to the data values at the various systems are communicated to the centralized database over the ESB.

The presentation layer, which is generally implemented as a user interface, displays data values retrieved from different systems of the network. More specifically, the user interface is configured to access data integrated by the ESB by, for example, submitting data requests including queries to be executed against the integrated data. Such queries facilitate analysis, validation, research, and comparison of data values associated with one or more of the systems coupled to the ESB. For example, in certain embodiments, the user interface is used to submit a data request that includes a query to retrieve data associated with a predefined global data field from one or more systems of the network. The retrieved data is then displayed by the user interface in a format that facilitates comparison and analysis, such as a table. The data values returned and displayed at the user interface can be analyzed and compared to each other for various purposes, including determining consistency of the data was across the systems from which it was retrieved.

Difficulties in data integration and analysis can arise from variations between networked systems including, without limitation, differences in levels of complexity of the systems, in types of databases implemented in the systems, in interfaces with the systems, and in communication protocols implemented in the systems. EITT applications in accordance with this disclosure address such differences and create a unified data comparison and validation framework. By doing so, troubleshooting time, frequency of maintenance issues, difficulty of identifying inconsistencies in data across multiple systems, and overall complexity of managing an enterprise-level network are all reduced. In customer service related applications, such benefits further enhance customer satisfaction.

FIG. 1 is an exemplary system 100 according to aspects of the present disclosure. The system 100 involves the use of an EITT application 106 for troubleshooting and analyzing data from multiple systems in a network, such as a network used for management and troubleshooting of a telecommunications network. The system 100 includes an enterprise service bus (ESB) 110, which is communicably coupled to multiple systems, such as a first system 112, a second system 114, and additional systems 115, 116. For purposes of example only, the first system 112 is a business support system ("BSS System") and the second system 114 is an operational support system ("OSS System"), which and generate and store data pertaining to orders and billing, respectively. The ESB 110 is configured to facilitate data integration and communication between systems coupled to the ESB, such as the first system 112 and the second system 114, and between the systems and the EITT application 106. As shown in FIG. 1, in certain implementations, the EITT application 106 may also be connected to one or more systems (e.g., the first system 112 and the second system 114) that are also connected to the ESB 110.

Figure 2:
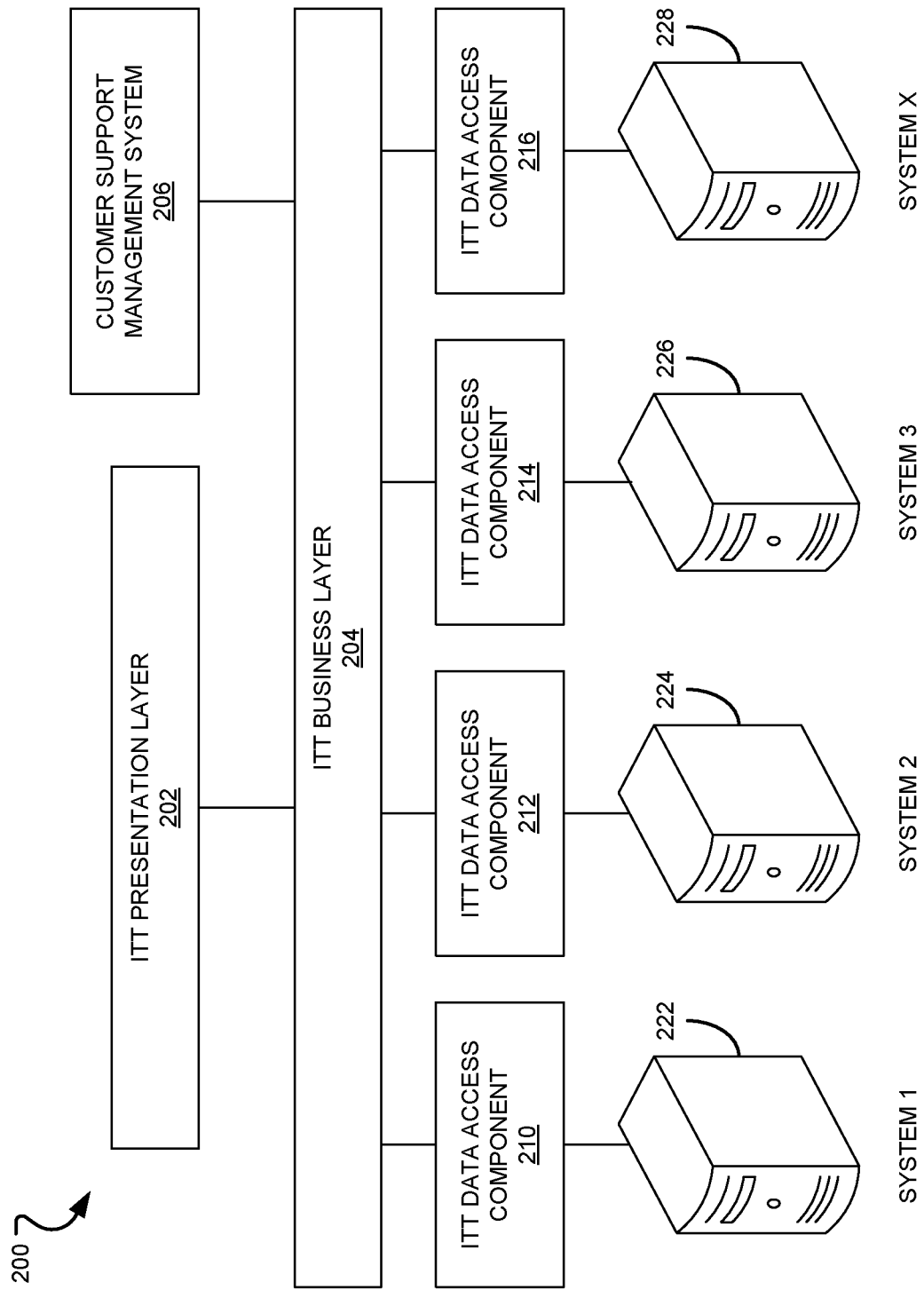
FIG. 2 is a schematic illustration of a system architecture for the enterprise data integration and troubleshooting tool of FIG. 1.

The ESB 110 is defined by logic of a business layer, such as the business layer 204 of FIG. 2, and is operable to integrate and retrieve data from systems coupled to the ESB. For example, the ESB 110 of the exemplary system 100 is operable to integrate and retrieve data from each of the first system 112 the second system 114, and the additional systems 115, 116. The ESB 110 can be implemented as software, hardware, or a combination of software and hardware for implementing communication between software components, such as applications or data access components associated with systems coupled to the ESB 110. The ESB 110 of FIG. 1, for example, is configured to communicate and interact with the first system 112, the second system 114, the additional systems 115, 116, the EITT application 106, and any corresponding software or hardware components.

The ESB 110 functions similarly to a hardware bus by providing a centralized hub for messaging and interaction. In other words, the ESB 110 manages access and communication of data and messages between systems coupled to the ESB 110, such as by allowing data from one or more respective systems to be queried. Notably, the ESB 110 provides a unified framework by enabling such communication despite differences in format, protocol, programming language, and the like that may exist between systems.

The ESB 110 may vary in structure and may include various software components, such as web service interfaces, to facilitate communication between systems and applications coupled to the ESB 110. In certain implementations, the ESB 110 includes a software intermediary, such as message-oriented middleware, to broker messages sent between systems. For example, the ESB 110 may include application integration middleware that facilitates communication using Java message calls. In other implementations, the ESB 110 includes a shared set of interfaces that facilitate communication between systems over the ESB 110 using one or more of a common data model, a common command set, and a messaging infrastructure. For example, the ESB 110 transforms data and messages from a local format corresponding to one of the first system 112, the second system 114, and/or any of the additional systems 115, 116 to a common data or message format and routes the transformed data/messages between the various systems in communication with the ESB 110.

In some embodiments, the ESB 110 includes at least one integration server, such as a web service-compatible integration server, to enable communication and data integration between the first system 112, the second system 114, and the additional systems 115, 116. For example, in certain implementations, each system in communication with the ESB 110 uses a corresponding integration server to connect to the ESB 110 and to send and receive data and messages over the ESB 110. The ESB 110 may further include one or more adapters 124, 126 (e.g., a Windows Communication Foundation (WCF) adapter) or adapter services to facilitate communication between systems coupled to the ESB 110. The adapters 124, 126 and/or adapter services may comprise various web interface protocols to manage data messaging between the systems. For example, an adapter or adapter service corresponding to a particular system may be operable to transform data or a message from a system format to a predefined bus format or other common or global format for communication over the ESB 110. In certain implementations, message consistency is maintained by transmitting messages over the ESB 110 in a common canonical format, such as XML.

In some specific embodiments, an application executed by the first system 112, the second system 114, or any of the additional systems 115, 116 may invoke services provided by the integration server 122 using a standard application programming interface (API). In certain implementations, the API is specific to a particular programming language, such as Java, C#, Perl, and the like. To invoke such services, a standard web service communication protocol, such as an XML protocol, may be implemented. A container for web services and orchestration may be incorporated in the integration server to support components for integration logic, such as message transformation. These components may implement additional standards for web services. Further, a standard administration protocol may be implemented for supervision of the framework established by the ESB 110. Additional architecture services that may be utilized by the ESB 110 include, without limitation: a transport service (e.g., Hypertext Transfer Protocol (HTTP)), a message service (e.g., Simple Object Access Protocol (SOAP)), a service contract (e.g., Web Service Definition Language (WSDL)), a directory service (e.g., Universal Description Discovery and Integration (UDDI)), a delivery guarantee service (e.g., Reliable Hypertext Transfer Protocol (HTTPR), Web Service (WS)-Reliability, ebXML messaging service), a graphical interface (e.g., a Web Services User Interface (WSUI), Web Services Interactive Applications (WSIA), Web Services for Remote Portlets (WSRP)), an encryption service (e.g., XML Encryption, WS security), a signature service (e.g., XML digital signature, WS Security), a single sign on service (e.g., Security Assertion Markup Language (SAML)), an access control list (e.g., eXtensible Access Control Markup Language (XACML)), a transaction service (e.g., Business Transaction Protocol (BTP), Extensive Application Markup Language (XAML), WS-Transaction, WS-Coordination), a service for management of public/private keys (e.g., XML Key Management Specification (XKMS)), a process representation service (e.g., Business Process Execution Language (BPEL), Business Process Modeling Language (BPML), XLANG by Microsoft, Web Services Flow Language (WSFL), WS Choreography), an administration service (e.g., Omi administration services by Hewlett Packard), a service for XML dialects of business messages (e.g., fpML, Chemical Markup Language (CML)), and a service for XML dialects of business processes (e.g., RosettaNet).

Each system coupled to the ESB 110 may store data in a particular format or as a particular data field. To the extent such data is shared across multiple systems, such discrepancies can create challenges in integrating and analyzing the data. Accordingly, in certain implementations, data integrated using the ESB 110 is associated with or mapped to one or more predefined global data fields. As a result, integrated data may be accessed based on the predefined global data fields as opposed to the particular data fields used by the particular system from which the data is integrated. So, referring to the system 100, data integrated from the first system 112, the second system 114, and the additional systems 115, 116, can be accessed through the ESB 110 based on the predefined global data fields regardless of any naming and format limitations/conventions implemented by the system from which the data was obtained.

In certain implementations, the integrated data is maintained on and accessed from the system from the data originates. In such embodiments, the ESB 110 includes a data map or similar transformation reference, service, or application to convert between a predefined global data field and a corresponding local data field of the originating system. As one specific example, a predetermined global data field, "NumCPEs", corresponds to a number of customer premises equipment (CPEs) associated with an order. For a particular order, the first system 112 stores a first corresponding data value in a first local data field "CPEs" and the second system 114 stores a second corresponding data value in a second local data field "NoCPEs". In response to a data request including the "NumCPEs" global data field, the ESB 110 or services or adapters of the ESB 110 converts the "NumCPEs" data field to each of "CPEs" and "NoCPEs" and generates two corresponding data requests that are then submitted to the first system 112 and the second system 114. The retrieved data may then be consolidated into a data set that is displayed by the user interface 130 using the "NumCPEs" global data field.

In one embodiment, the ESB 110 stores data integrated from the first system 112, the second system 114, and the additional systems 115, 116 within a centralized database 128 or similar repository. In certain embodiments, a federated database is used in addition to or instead of the centralized database 128. More specifically, data from different systems coupled to the ESB 110 is transparently mapped/replicated to one or more federated databases, for example, by using data access components corresponding to each system. When the federated database is queried, the ESB 110 determines which data access components/systems are to be accessed to respond to the query. Such a federated database may define a form of database virtualization in that databases or data access components associated with multiple systems may appear as one to the EITT application 106. Thus, a federated database can be composed of a collection of databases, and allows applications such as the EITT application 106 to look at data in a unified way without having to duplicate the data across databases or make multiple queries and manually combine the results.

FIG. 1 further shows a user interface 130 or similar dashboard of the EITT application 106. The user interface 130 is in communication with and/or forms part of the ESB 110, and accesses the first system 112, the second system 114, and the additional systems 115, 116 through the ESB 110. In certain implementations, the user interface 130 accesses the ESB 110 via a network 108 or similar connection, which may be wired, wireless, or any other suitable connection type. The user interface 130 is operable to access and view data integrated by the ESB 110 and includes an input component configured to receive and process queries in order to retrieve data integrated by the ESB 110. For example, in certain implementations, the user interface 130 allows a user to select one or more predetermined global data fields and systems and to generate a corresponding data request. The user interface 130 transmits the data request to the ESB 110 such that the data request can be communicated to and executed by the corresponding systems (including application of any necessary transformations or conversions of the data request from a global format to a system format). In response, the user interface 130 receives and displays results of queries executed against the integrated data accessible through the ESB 110 in a comparative format, such as a table. As noted above, in some implementations, integrated data is organized based on predefined global data fields. In such implementations, the user interface 130 may generate and provide digital reports regarding data values associated with predefined global data fields of interest and, as a result, may be especially useful in identifying data discrepancies between different systems.

The first system 112, the second system 114, and the additional systems 115, 116 may comprise different systems associated with a network with at least a subset of the systems having different functions, protocols, interfaces, programming languages, and the like relative to the other systems. For example, data from the second system 114 can be shared and/or replicated to the first system 112. Data between the first system 112, the second system 114, and the additional systems 115, 116 may be asynchronously or synchronously integrated.

In certain implementations, data values corresponding to systems in communication with the ESB 110 are replicated across other systems coupled to the ESB 110. As one specific example, when an order is received by or inputted into the second system 114, a portion of the data corresponding to the order may be replicated in the first system 112, i.e., the billing system. For example, in response to a new order entry in the second system 114 or a modification to an existing order, the second system 114 retrieves data pertaining to the new order and transmits the data via the ESB 110 to the first system 112 ensuring consistency between the ordering and billing systems.

As further shown, the EITT application 106 is in communication with a customer support management system 104, a tier 2 customer service representative (CSR) device 118, and a tier 3 CSR device 120. The customer support management system 104 manages the CSR devices and may generally automate work flow for providing Information Technology (IT) management and customer support. The tier 2 CSR device 118 and the tier 3 CSR device 120 generally include one or more laptops, personal computers, servers, telephones, smartphones, tablets, and the like. The tier 2 CSR device 118 is used to provide basic level support and analysis of the integrated data made available by the ESB 110. For example, in one implementation, the tier 2 CSR device 118 executes basic queries for information from the integrated data provided via the EITT application 106. If data is missing, incorrectly replicated, or otherwise in error, the tier 3 CSR device 120 is used to correct the problem and/or otherwise alerted. For example, the tier 3 CSR device 120 may be associated with a human operator who may be alerted by the customer support management system 104 when the tier 2 CSR device 118 determines that a data value is missing from a predetermined global data field for a specific system.

In certain implementations, digital tickets are implemented to communicate the data discrepancies or omissions between the tier 2 CSR 118, the tier 3 CSR 120, and the customer support management system 104. The digital tickets may be electronic messages or emails identifying specific issues/tasks that need to be addressed by the respective devices. For example, when the tier 2 CSR device 118 determines that a data value is missing from a predetermined global data field for a specific system, a digital ticket is generated and transmitted to the tier 3 CSR device 120. In some embodiments, some or all of the tasks carried out by either the tier 2 CSR device 118 or the tier 3 CSR device 120 are performed automatically. For example, either device may be configured with scripts or similar logic to execute certain predefined queries, with or without reduced human intervention, and/or to adjust data values in different systems based on the identification of data discrepanceis.

FIG. 2 is a schematic illustration of a system architecture 200 corresponding to a system for implementing an EITT application, such as the system 100 of FIG. 1. The system architecture 200 includes a business layer 204 for integrating data from different systems and a presentation layer 202 for displaying the integrated data. The system architecture 200 further includes a plurality of systems associated with a network, namely, system 1 222, system 2 224, system 3 226, and system X 228. In some embodiments, data access components 210, 212, 214, and 216 are configured to retrieve data from, respectively, system 1 222, system 2 224, system 3 226, and system 4 228 and the business layer 204 integrates the retrieved data from the different systems into a unified framework using an ESB, such as the ESB 110 of FIG. 1. System 1 222, system 2 224, system 3 226, and system X 228 may correspond to different computing environments. For example, in one embodiment, system 1 222 is an order system including order data, and system 2 224 is a billing system including billing data. In some embodiments, system 1 222, system 2 224, system 3 226, and system X 228 include specific applications, such as Siebel or similar customer relationship management applications. Although systems 222, 224, 226, and 228 may use different interfaces, databases, and data formats, it is generally desirable that at least certain data values be consistent across some of the systems 222, 224, 226, and 228, particularly when data from one of the systems is replicated to one or more other systems.

In some embodiments, each of the data access components 210, 212, 214, and 216 are operable to retrieve and/or access data values associated with predefined global data fields from their respective systems. For example, the data access component 210 is operable to retrieve data values for the predefined global data fields from system 1 222. Data retrieved using the data access components 210, 212, 214, and 216 is accessed and integrated by the business layer 204 and, more specifically, by an ESB of the business layer 204. In some embodiments, data retrieved from the data access components 210, 212, 214, and 216 is integrated by the ESB to create a centralized database, which may delineate values of the integrated data. For example, in one embodiment, columns of the centralized database are associated with different systems and rows of the centralized database correspond to predetermined global data fields (e.g., order number, order items, billing code, etc.).

Using the logic and information of the business layer 204, the presentation layer 202 retrieves and displays data values using a user interface, such as the user interface 130 of FIG. 1, for different data fields corresponding to different systems in the database. For example, in one implementation, the presentation layer 202 retrieves and displays data values corresponding to one or more predetermined global data fields in a comparative format, such as a table, thereby facilitating side-by-side comparison of the data values retrieved from different systems. As such, the presentation layer is useful in identifying discrepancies in data values, such as when data values corresponding to one system are missing or otherwise inconsistent with data values of other systems. For example, data replicated across each of system 1 222 and system 2 224 can be compared using a tabular format after such data has been integrated by the ESB 110.

In certain implementations, data is retrieved and displayed by the presentation layer 202 in response to data requests and corresponding queries submitted via the user interface 130. More specifically, data requests provided by the user interface 130 can be used to retrieve the integrated data (whether distributed across the systems or maintained in a centralized database) for example, by forwarding the data request to the data access components 210, 212, 214, and 216 or directly to the systems 222, 224, 226, and 228.

In one specific example, and with reference to Table 1 below, a user of the user interface 130, shown in FIG. 1, may wish to determine whether data values for a particular order—order #1234—are consistent across two systems—System A and System B. For example, System A may correspond to an operational support system and System B may correspond to a business support system, each of which includes an entry corresponding to order #1234 that includes data replicated between System A and System B. For example, each of System A and System B may store the number of VPN configurations and the number of CPE devices for order #1234. Accordingly, a user of the user interface 130 may wish to confirm that the values stored in System A and System B for the number of VPN configurations and the number of CPE devices for order #1234 are consistent. To do so, the user submits a data request through the user interface 130 that includes a query for data values corresponding to order #1234 and, more specifically, for data values corresponding to the number of VPN configurations and the number of CPE devices for order #1234. The data request is then transmitted to the ESB 110 and executed to retrieve the requested data values from the data integrated by the ESB 110. The retrieved data is then displayed via the user interface 130 in a comparative format, such as that depicted in Table 1.

TABLE 1

|  | System A | System B |
| --- | --- | --- |
| Order # | 1234 | 1234 |
| CPE Devices | 23 | 23 |
| # of VPN configurations | 3 | 4 |

To the extent System A and System B function using different message formats, routing protocols, and the like, the ESB 110 performs any necessary conversion or transformation of data or messages to facilitate communication between the user interface 130, System A, and System B. For example, in certain implementations, the ESB 110 includes integration servers, data access components, or adapters corresponding to each of System A and System B such that messages or data from System A and System B are converted from system-specific formats or protocols to a common messaging format or protocol for transmission over the ESB 110. Similarly, to the extent the ESB 110 communicates data or messages to System A or System B, the integration servers, data access components, or adapters further convert messages and data from the common messaging format or protocol to the system-specific formats or protocols.

For example, in certain implementations, a data request received by the ESB 110 from the user interface 130 may be used to generate two data requests formatted in a first format compatible with System A and a second format compatible with System B. The formatted data requests may then be sent to System A and System B and processed to retrieve the requested data. To the extent the format of the returned data is incompatible with the user interface 130, the returned data may be converted back to a format usable by the user interface 130 for processing and display.

As shown in Table 1, the data value returned by System A is "3" VPN configurations for order #1234. In other words, databases or other storage associated with System A currently define the data value of "3" for the predefined global data field of "# of VPN configurations" for order #1234. Similarly, databases or other storage associated with System B return a data value of "4" for the same predefined global data field. Such a discrepancy in data may indicate that data replication between System A and System B has failed and that remedial actions should be taken to identify which system is in error and to update the system with the correct value.

The presentation layer 202 is operable to present data from multiple systems in a centralized graphical format, such as the user interface 130, as made accessible by the ESB 110. For example, the values of Table 1 above may be displayed to a user by logic of the presentation layer 202. The user interface 130 of the presentation layer 202 allows research to be conducted across one or more systems, for a user to conduct data queries executed against the integrated data, and to view the results of such queries. Using a graphical table, such as Table 1, the presentation layer 202 may present a side-by-side comparison of data values to depict data of different systems and show differences and discrepancies in data.

Returning to the business layer 204, the ESB 110 of the business layer 204 may present data of different systems as a single framework, whereas conventional enterprises network environments may require multiple tools to analyze data of different systems. The business layer 204 generally contains logic for integrating the data of different systems using data retrieved, for example using data access components, and defines an ESB 110 for comparing and communicating data between different systems as described above. In some embodiments, the ESB 110 of the business layer 204 functions as a bus for linking together different systems (such as system 1 222, system 2 224, system 3 226, and system X 228), interpreting requests for data from the different systems, and passing data between systems.

In some embodiments, the business layer 204 further includes data integration configuration information based on one or more scripts that are stored on a database. The scripts may define predetermined global data fields to identify specific types of data values for the ESB 110 to integrate data from different systems. For example, in certain embodiments, the scripts execute a mapping function that translates between predetermined global data fields and local data fields corresponding to one or more systems coupled to the ESB 110. The business layer 204 may also perform operations on the integrated data. For example, in one embodiment, the business layer 204 compares data between two systems using differential comparison and the result is presented as comparison data using the presentation layer 202.

In some enterprise environments, replication of data between different systems occurs sequentially, in other words, system-to-system. More specifically, referring to FIG. 2, in some embodiments, data from system 1 222 is replicated to system 2 224, then further replicated to system 3 226. If data is not accurate during replication of the data between system 1 222 and system 2 224, then by nature of such downstream replication systems, the data may not be accurate when replicated to system 3 226. Because the business layer 204 is operable to check for inconsistencies in data between different systems, the business layer 204 can reduce the chance that data is incorrectly replicated to other systems and can further identify data discrepancies after replication. Using the business layer 204, data from different systems of an enterprise network of a service provider is integrated, thereby enabling validation and comparison of data from respective systems using a single framework and user interface 130. Troubleshooting is made easier by nature of having a user interface 130 from which to conduct data queries and manage data between multiple different systems. Data loss is reduced, and customer satisfaction is improved as a result of better data accuracy and consistency.

Figure 3:
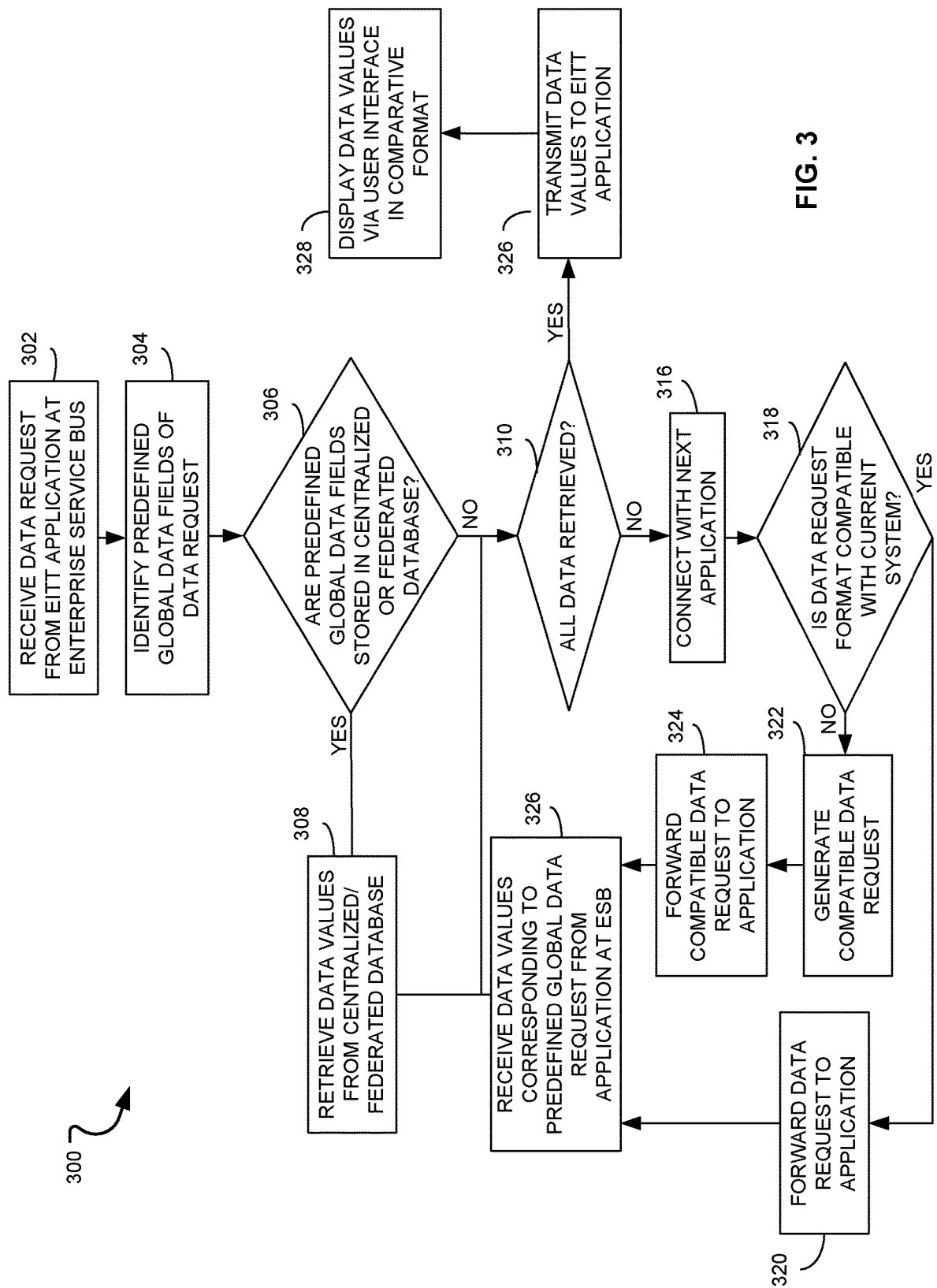
FIG. 3 illustrates an exemplary process flow for integrating data using an enterprise service bus and presenting aspects of the integrated data at a user interface.

FIG. 3 is a flow chart illustrating an exemplary method for retrieving and displaying integrated data from a plurality of networked systems, such as may be implemented by the system 100 of FIG. 1. With reference to the system 100, the method 300 includes receiving a data request at an ESB 110 from an EITT application 106 (operation 302). As previously discussed the data request generally includes one or more data fields of interest and the corresponding systems coupled to the ESB 110 from which data values corresponding to the data fields are to be retrieved.

Upon receiving the data request, the ESB 110 or a software component thereof, identifies any predefined global data fields within the data request (operation 304) and whether the predefined global data fields are stored in a centralized or federated database (operation 306). To the extent the data fields are stored in a centralized or federated database, the corresponding data values are retrieved from the corresponding database (operation 308). For example, in certain implementations, the data request is converted into a query that is executed against the database to retrieve the requested data.

The system 100 then determines whether the data request has been satisfied (operation 310). If so, the retrieved data values are transmitted to the EITT application 106 (operation 312) and displayed in a comparative format via a user interface 130 (operation 314).

If the data request is not satisfied, the system 100 connects via the ESB 110 with the first application from which data is still outstanding (operation 316) and determines whether the data request format is compatible with the application (operation 318). If so, the data request is forwarded to the application for execution (operation 320). If not, a compatible data request is generated based on the data request (operation 322) and the compatible data request is forwarded to the application (operation 324). The application executes either the data request or the compatible data request and returns the corresponding data values, which are received by the ESB 110 (operation 326).

After the data request has been satisfied, the data values are transmitted to the EITT application 106 via the ESB (operation 326) and the EITT application 106 causes the data values to be displayed in a comparative format on a user interface 130 (operation 328).

In sum, and referring to FIG. 1, the ESB 110 defines a distributed architecture and acts as an intermediary between disparate applications associated with multiple different systems, such as the first system 112, the second system 114, and additional systems 115, 116. The ESB 110 further enables the applications to communicate, send data back and forth, and/or make data of all of the systems available to other systems and computing devices having access to the ESB 110. In certain implementations, the ESB 110 transforms and routes messages between applications associated with the first system 112, the second system 114, and the additional systems 115, 116. In such implementations, the ESB 110 may replace direct contact between the applications with respect to data sharing and integration such that all data communications among the applications take place via the ESB 110. For example, where a data request is made from the user interface 130 to retrieve data from one or more of the systems coupled to the ESB 110, the ESB 110 routes the request to the appropriate application(s) and coordinates any necessary transformation or conversion of the data request for processing by the corresponding system. In other words, applications associated with the first system 112, the second system 114, and the additional systems 115,116 are connected to the ESB 110, and the ESB 110 enables data access communications between the applications to make data of the applications accessible to the user interface 130 as integrated data.

In certain implementations, at least one adapter is implemented to transform or convert data and messages between a system-specific format and an ESB or similar global format for communication over the ESB 110. For example, in one implementation, a message is converted from a Simple Object Access Protocol (SOAP) format over HyperText Transfer Protocol (HTTP) protocol to the SOAP format over Message Queue (MQ) protocol in order for a first application or computing device to receive a data request from a second application or computing device. The adapter may be analogous to a physical network adapter, and may utilize XML and Extensible Stylesheet Language Transformations (XSLT). The ESB 110 and/or the EITT application 160 may also be implemented using J2EE and/or .NET.

Using the ESB 110, a data request can be made to the first system 112, the second system 114, and/or any of the additional systems 115, 116 using the user interface 130. The request may comprise parameters including a predefined global data field and a requested application or system from which to retrieve data values. Using the architecture of the ESB 110, data from the first system 112 and/or the second system 114 is retrieved to fulfill the data request based upon the request parameters. The retrieved data is then used to create a dataset which may be displayed at the user interface 130. The dataset may include at least one data value corresponding to the predefined data field. In some embodiments, the dataset may include a set of values associated with each of a plurality of applications for the predefined global data field. The dataset may be displayed at the user interface 130 in a tabular or other comparative format to enable an administrator to verify data consistency across the systems from which the dataset was retrieved.

In some embodiments, when data discrepancies are identified in the dataset presented at the user interface 130, the EITT application 106 automatically updates data values for systems that return incorrect or missing data values in the dataset. For example, where a dataset indicates that the first system 112 shows a value for a certain predefined data field that is different from values returned from the second system 114 or any of the additional systems 115, 116, for that certain predefined data field, the EITT application 106 maps the correct value to the first system 112. Alternatively, the EITT application 106 is configured to generate a ticket or similar alert, either automatically or in response to a user-provided command, indicating the data discrepancy and to send or forward the ticket for remediation.

Figure 4:
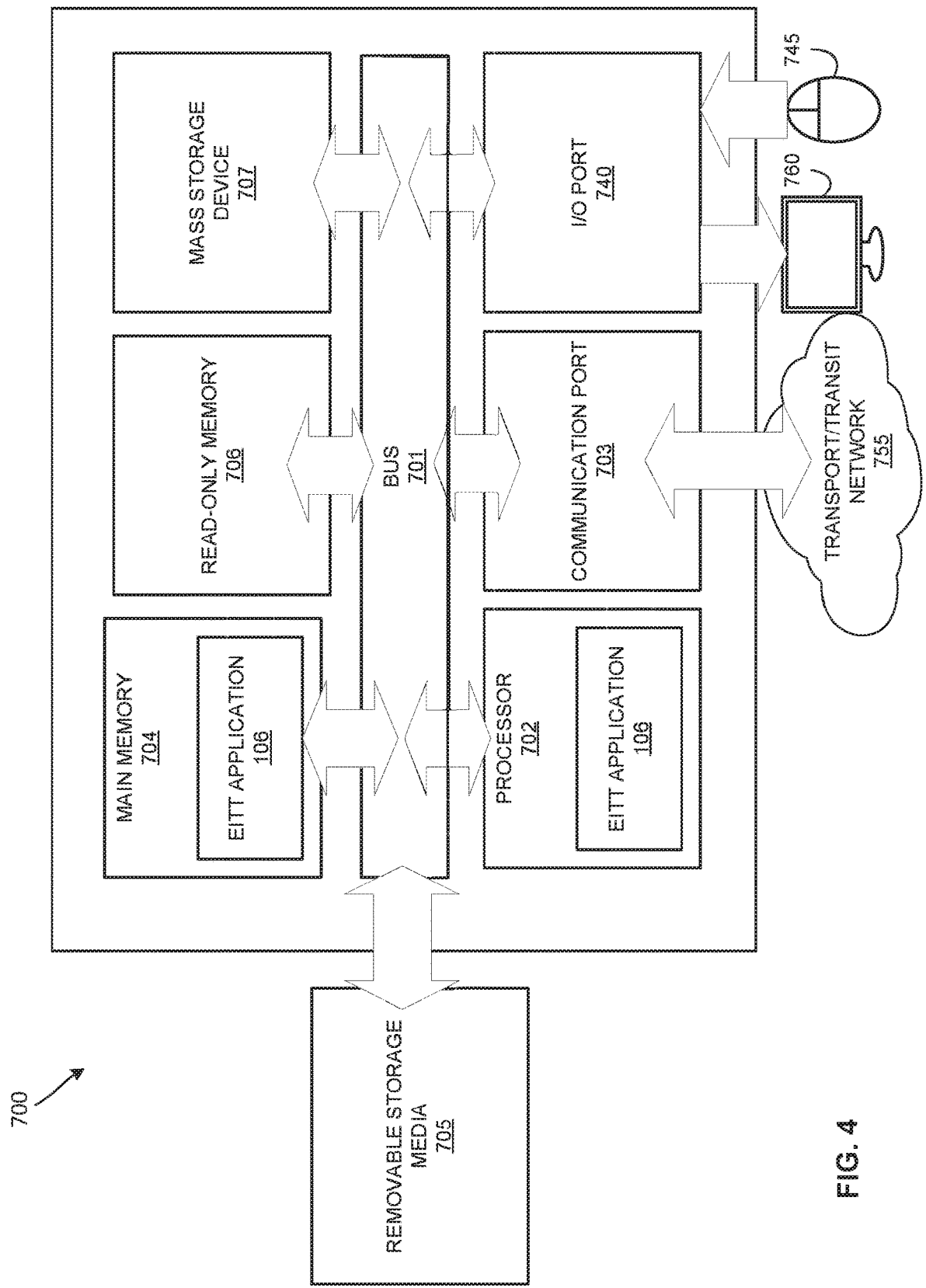
FIG. 4 depicts an exemplary computing system that may implement various services, systems, and methods discussed herein.

FIG. 4 is an example schematic diagram of a computing system 700 that may implement various methodologies discussed herein. For example, the computing system 700 may include a laptop, desktop, or server used to execute the EITT application 106 operable to integrate multiple platforms across an enterprise level service provider and provide a centralized interface for data queries and troubleshooting. The computing system 700 includes a bus 701, at least one processor 702 or other computing element, at least one communication port 703, a main memory 704, a removable storage media 705, a read-only memory 706, and a mass storage device 707. Processor(s) 702 can be any known processor, such as, but not limited to, an Intel® Itanium® or Itanium 2® processor(s), AMD® Opteron® or Athlon MP® processor(s), or Motorola® lines of processors. Communication port 703 can be any known communication port, such as, but not limited to an RS-232 port for use with a modem based dial-up connection, a 10/100 Ethernet port, a Gigabit port using copper or fiber, or a USB port. Communication port(s) 703 may be chosen depending on a network such as a Local Area Network (LAN), a Wide Area Network (WAN), or any network to which the computing system 700 connects. The computing system 700 may further include a transport and/or transit network 755, a display screen 760, an I/O port 740, and an input device 745 such as a mouse or keyboard.

The main memory 704 can be Random Access Memory (RAM) or any other dynamic storage device(s) commonly known in the art. The read-only memory 706 can be any static storage device(s) such as Programmable Read-Only Memory (PROM) chips for storing static information such as instructions for processor 702. The mass storage device 707 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

The bus 701 communicatively couples the processor(s) 702 with the other memory, storage, and communications blocks. The bus 701 can be any known bus, such as a PCI/PCI-X, SCSI, or Universal Serial Bus (USB) based system bus depending on the storage devices used. The removable storage media 705 can be any kind of external hard drives, thumb drives, Compact Disc-Read Only Memory (CD-ROM), Compact Disc-Re-Writable (CD-RW), Digital Video Disk-Read Only Memory (DVD-ROM), and the like.

Embodiments herein may be provided as a computer program product, which may include a machine-readable medium having stored thereon instructions which may be used to program a computer (or other electronic devices) to perform a process. The machine-readable medium may include, but is not limited to optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, the main memory 704 is encoded with an EITT application 106 that supports functionality as discussed herein. For example, in one embodiment, the EITT application 106 may include or otherwise implement the various processes and/or instructions for integrating data across multiple platforms/systems as described herein. At least a portion of the EITT application 106 (and/or other resources as described herein) can be embodied as software code such as data and/or logic instructions (e.g., code stored in the memory or on another computer readable medium such as a disk) that supports processing functionality according to different embodiments described herein. During operation of one embodiment, the processor(s) 702 accesses the main memory 704 via use of the bus 701 in order to launch, run, execute, interpret, or otherwise perform processes, such as through logic instructions, executing on the processor(s) 702 and based on the EITT application 106 and associated software modules stored in the main memory 704 or otherwise tangibly stored.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method of retrieving and presenting integrated data from systems in a network, comprising:
   receiving, at an enterprise service bus (ESB), a data request for integrated data pertaining to a plurality of applications executed by a plurality of computing systems communicatively coupled to the ESB, wherein the data request includes at least one predefined global data field, wherein the at least one predefined global data field is specific to a computing system of the plurality of computing systems, and wherein the data request is initiated by the computing system;
   retrieving a data set including a data value corresponding to the predefined global data field from a first application of the plurality of applications and from a second application of the plurality of applications, at least one of the first or second applications using a different data field from that of the predefined global data field to maintain the data value corresponding to the predefined global data field; and
   transmitting the data value corresponding to the predefined global data field for each of the first and second applications to a user interface for display in a comparative format.

2. The method of claim 1, wherein retrieving the data set corresponding to the predefined global data field comprises forwarding the data request to each of the first application and the second application.

3. The method of claim 2, wherein forwarding the data request comprises:
   generating a first transformed data request by transforming the data request into a first format compatible with the first application;
   forwarding the first transformed data request to the first application;
   generating a second transformed data request by transforming the data request into a second format, different than the first format, compatible with the second application; and
   forwarding the second transformed data request to the second application.

4. The method of claim 3, wherein at least one of generating the first transformed data request and generating the second transformed data request comprises identifying a system-specific data field of the first application and the second application, respectively, the system-specific data field corresponding to the predefined global data field.

5. The method of claim 1, wherein retrieving data corresponding to the predefined global data field comprises executing a query based on the data request against a database, the database storing data of the plurality of applications pertaining to a plurality of predefined global data fields, and wherein the predefined global data field is the same for another computing system of the plurality of computing systems.

6. The method of claim 5, wherein the database is one of a centralized database and a federated database, the federated database distributed among at least a portion of the plurality of computing systems and connected via the ESB, further comprising:
   determining, based on the predefined global data field, a first local value associated with the computing system, wherein the data value is the first local value; and
   determining, based on the predefined global data field, a second local value associated with the other computing system, wherein the first local value is different than the second local value.

7. The method of claim 1, wherein the data request and the retrieved data are transmitted over the ESB using a common messaging format, the method further comprising converting at least one of the data request and the retrieved data into the common messaging format for transmission over the ESB.

8. The method of claim 1, further comprising displaying the data set in a comparative format, wherein displaying the data set in the comparative format comprises displaying the data set in a tabular format to enable an administrator to verify data consistency of data values associated with the predefined global data field between the first application and the second application.

9. The method of claim 1, wherein communication between at least one of the first application and the second application and the ESB is facilitated by at least one of a data access component, an adapter, an integration server, and a shared set of web interfaces.

10. The method of claim 1, further comprising:
    receiving, from the user interface, a notification regarding a discrepancy between the data values retrieved from the first application and the second application;
    generating at least one of an alert and a ticket containing information regarding the discrepancy; and
    transmitting the at least one of the alert and the ticket to a customer service representative computing device.

11. A system for retrieving integrated data comprising:
    an enterprise service bus (ESB) communicatively coupled to a user interface and to a plurality of applications of a plurality of computing systems, wherein the enterprise service bus is configured to receive a data request from the user interface, the data request including at least one predefined global data field, wherein the at least one predefined global data field is specific to a computing system of the plurality of computing systems, and wherein the data request is initiated by the computing system;
one or more processors communicatively coupled to the ESB; and
non-transitory computer-readable storage media communicatively coupled to the one or more processors having instructions stored thereon that, when executed by the one or more processors, cause the one or more processors to:
retrieve a data value corresponding to the at least one predefined global data field by communicating the data request to at least one of an application of the plurality of applications and a data store containing the integrated data, the at least one the application of the plurality of applications using a different data field from that of the predefined global data field to maintain the data value corresponding to the at least one predefined global data field; and
transmit the retrieved data value to the user interface via the ESB.

12. The system of claim 11, wherein the data store containing the integrated data is at least one of a centralized database configured to receive data from at least a portion of the plurality of applications and a federated database distributed among at least a portion of the plurality of applications.

13. The system of claim 11, wherein the ESB comprises at least one of a data access component, an adapter, an integration server, and a shared set of web interfaces configured to convert the data request to a system-specific data format corresponding to an application of the plurality of applications.

14. The system of claim 11, wherein the ESB is further configured to facilitate communication between a first application of the plurality of applications and a second application of the plurality of applications.

15. The system of claim 14, wherein communication between the first application and the second application includes replicating data between the first application and the second application.

16. The system of claim 14, wherein facilitating communication between the first application and the second application comprises:
receiving a message in a first format compatible with the first application;
transforming the message to a second format, different from the first format and compatible with the second application; and
transmitting the message in the second format to the second application.

17. A system for requesting and analyzing integrated data from a network comprising:
a user interface;
one or more processors communicatively coupled to an enterprise service bus (ESB); and
non-transitory computer-readable storage media communicatively coupled to the one or more processors having instructions stored thereon that, when executed by the one or more processors, cause the one or more processors to:
generate data requests including at least one predefined global data field, wherein the at least one predefined global data field is specific to the system;
transmit the data requests to the ESB;
receive a data set including a data value corresponding to the at least one predefined global data field from the ESB, the data value maintained by at least one application using a different data field from that of the predefined global data field; and
display the data set including the data value in a comparative format via the user interface.

18. The system of claim 17, wherein:
the data set includes a first data value corresponding to the predefined global data field from a first application coupled to the ESB and a second data value corresponding to the predefined global data field from a second application coupled to the ESB; and
the user interface is configured to display the data set in a comparative format by adjacently displaying the first data value and the second data value in a table.

19. The system of claim 18, wherein the user interface is further configured to:
receive a notification regarding a discrepancy between the data values retrieved from the first application and the second application;
generate, in response to receiving the notification, at least one of an alert and a ticket containing information regarding the discrepancy; and
transmitting the at least one of the alert and the ticket to a customer service representative computing device communicatively coupled to the user interface.

20. The system of claim 17, wherein the user interface is configured to generate data requests in response to receiving a first selection of the at least one predefined global data field from a plurality of global data fields presented via the user interface and receiving a second selection of the at least one application from among a plurality of applications communicatively coupled to the ESB.

* * * * *